Dec. 8, 1942.　　　N. E. WAHLBERG　　　2,304,291
WHEEL SUSPENSION
Filed Jan. 6, 1940　　　7 Sheets-Sheet 2

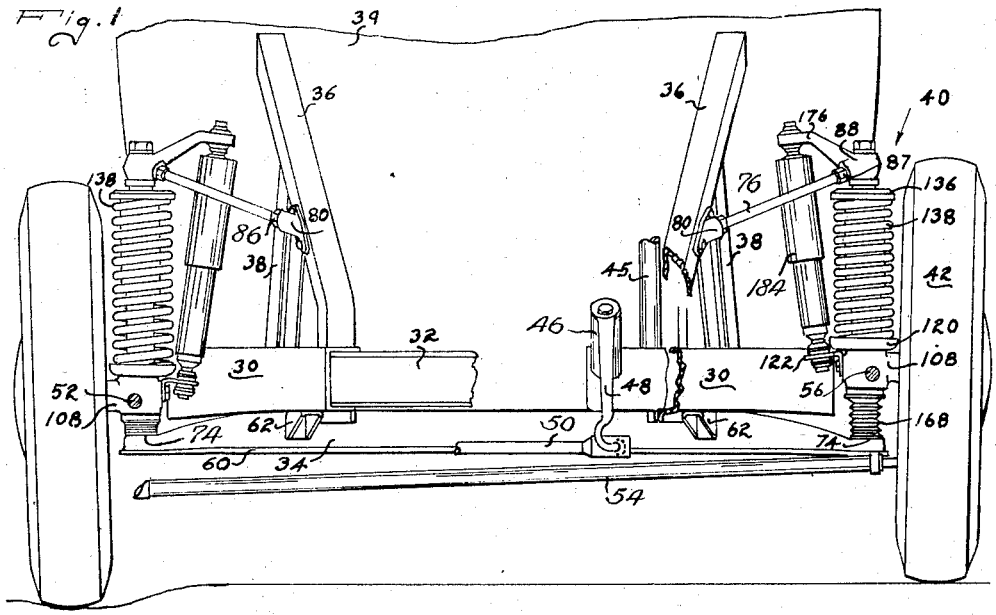

INVENTOR.
NILS ERIK WAHLBERG
BY Carl J. Barkee
ATTORNEY.

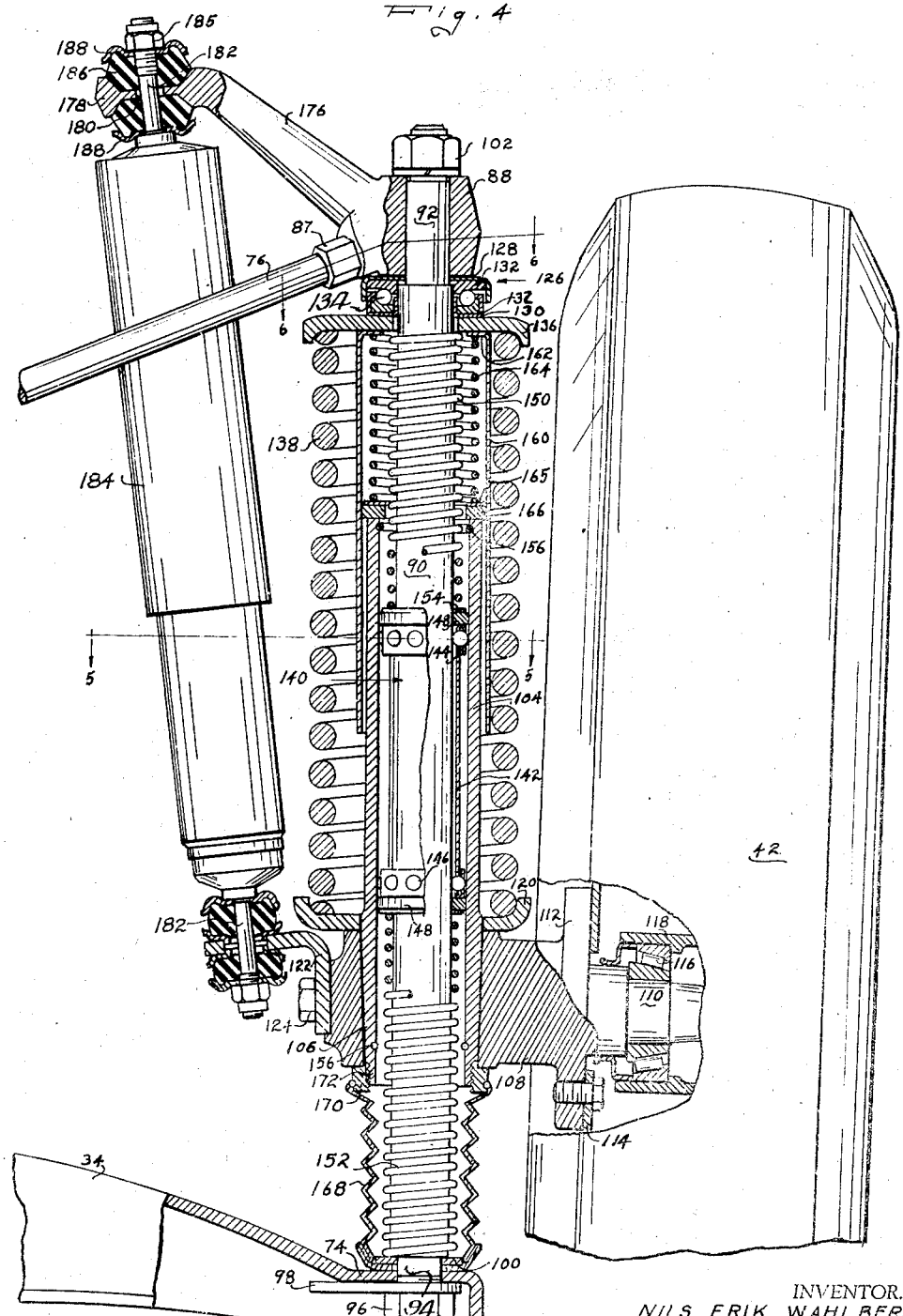

Dec. 8, 1942.     N. E. WAHLBERG     2,304,291
WHEEL SUSPENSION
Filed Jan. 6, 1940     7 Sheets-Sheet 4
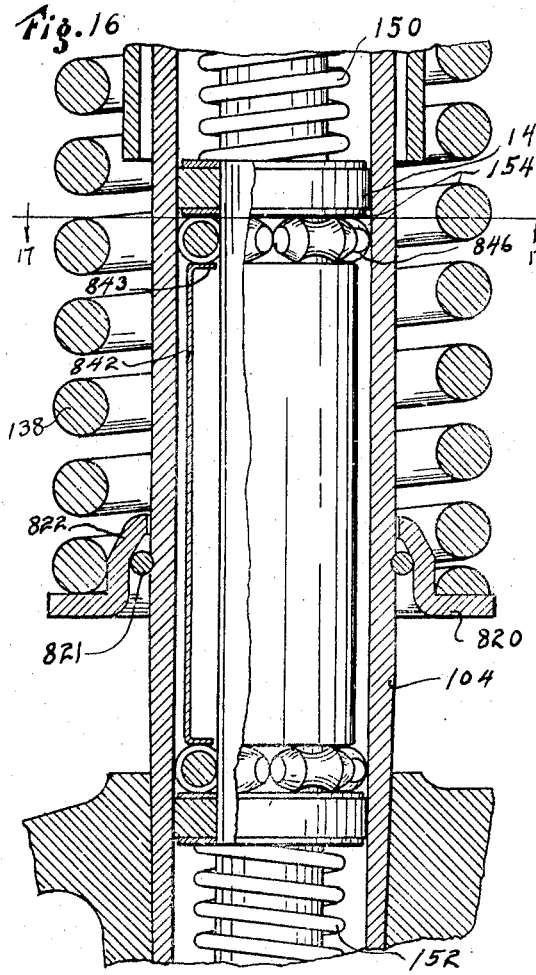
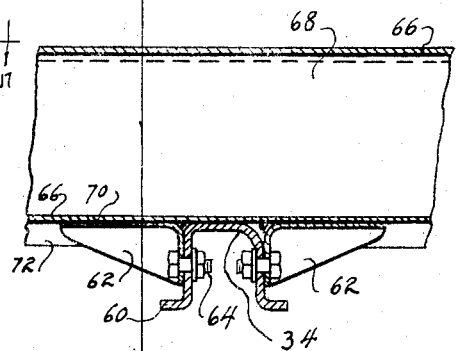
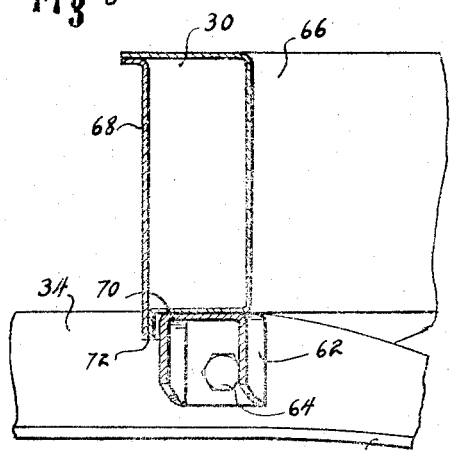
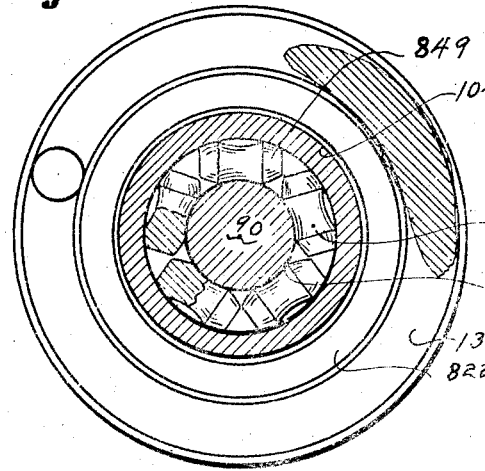
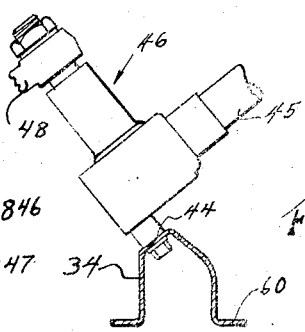
INVENTOR.
NILS ERIK WAHLBERG
BY Carl J. Barbee
ATTORNEY.

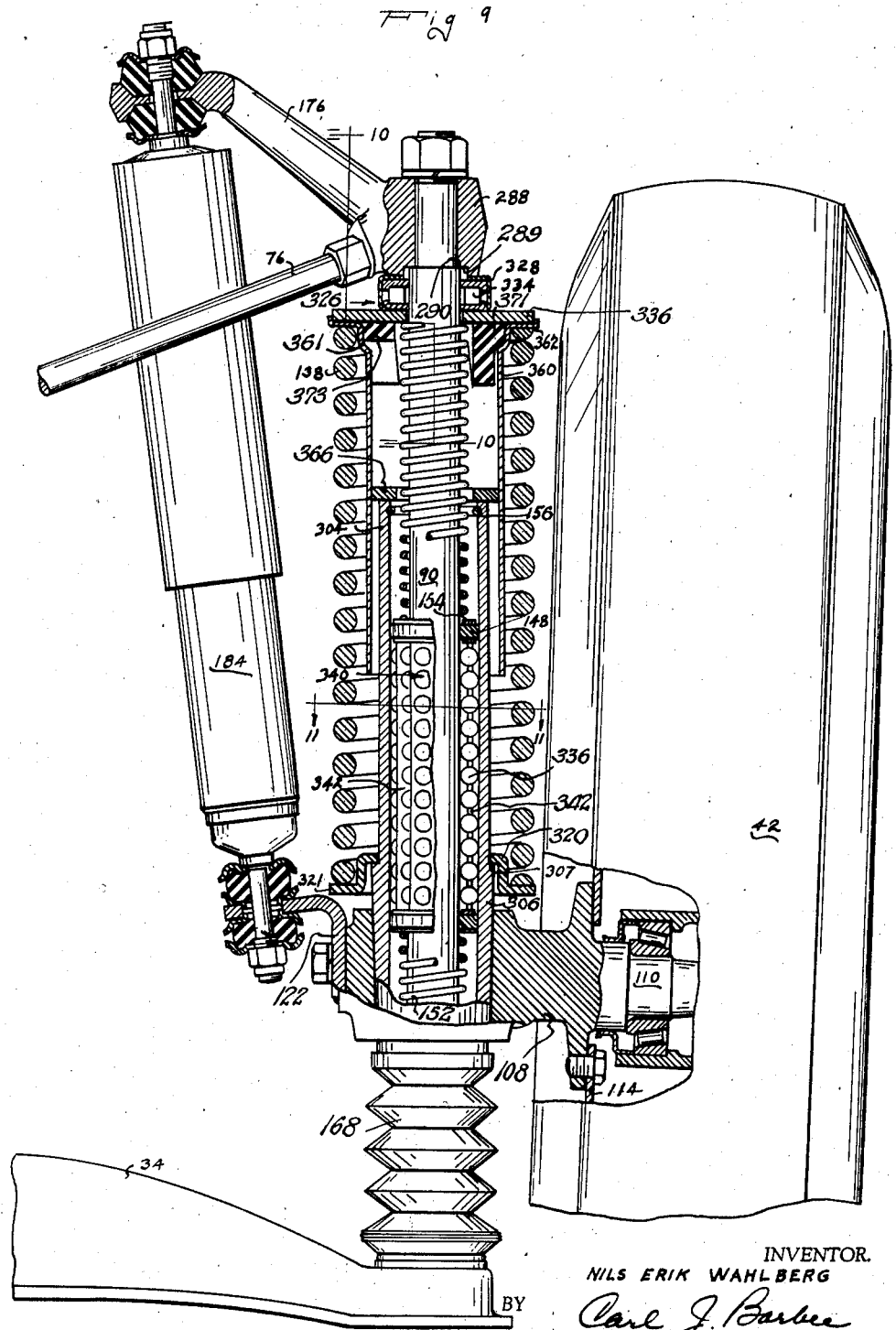

Dec. 8, 1942.　　　　N. E. WAHLBERG　　　　2,304,291
WHEEL SUSPENSION
Filed Jan. 6, 1940　　　　7 Sheets-Sheet 6
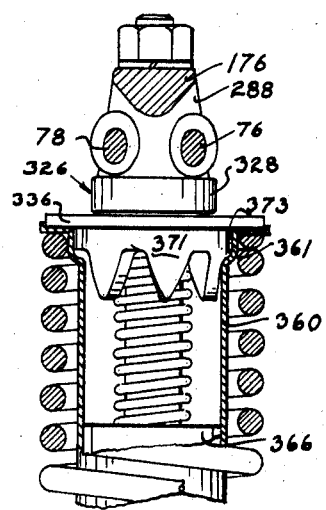
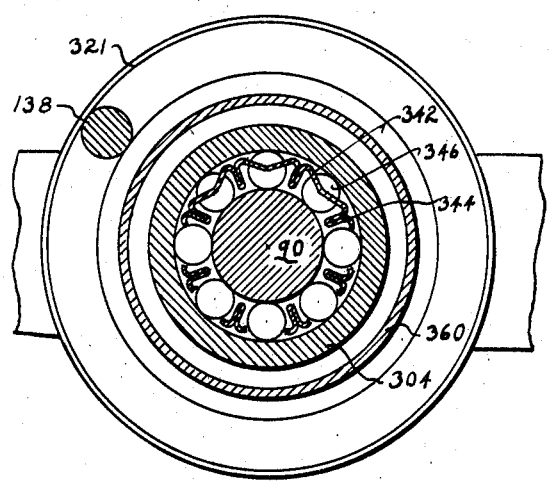
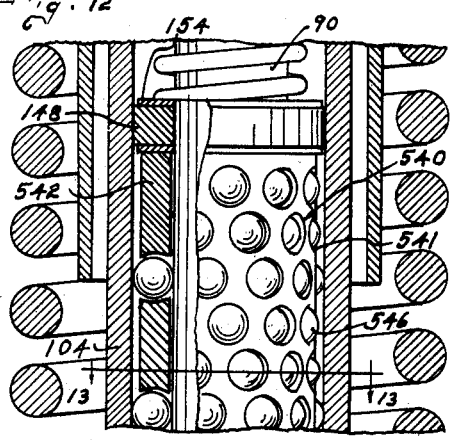
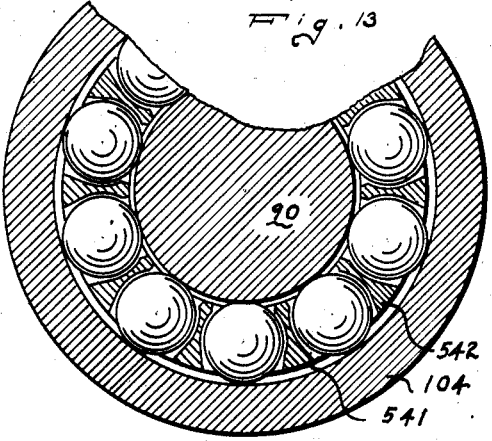
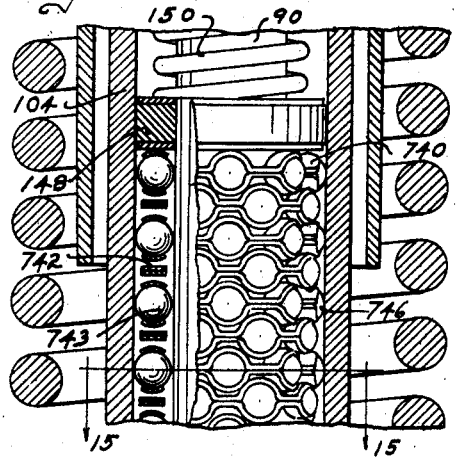
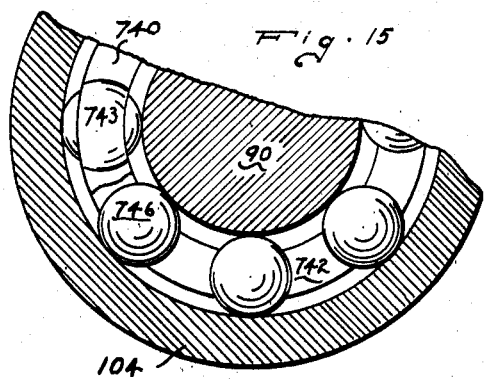
INVENTOR.
NILS ERIK WAHLBERG
BY
ATTORNEY.

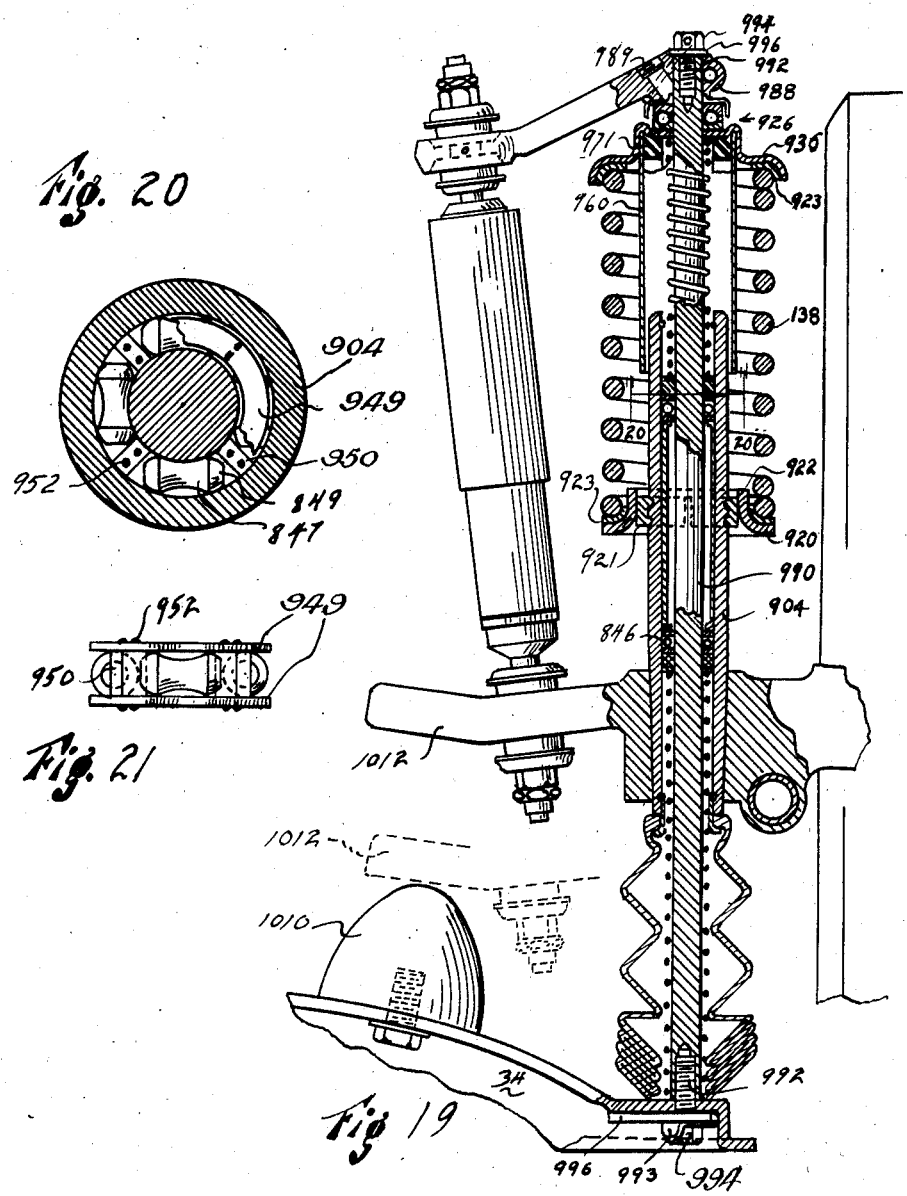

Patented Dec. 8, 1942

2,304,291

UNITED STATES PATENT OFFICE 2,304,291

WHEEL SUSPENSION

Nils Erik Wahlberg, Kenosha, Wis., assignor to Nash-Kelvinator Corporation, Kenosha, Wis., a corporation of Maryland Application January 6, 1940, Serial No. 312,656

24 Claims. (Cl. 280—96.2)

This invention relates to automotive construction and has particular reference to a type of wheel suspension in which the individual wheels are independently sprung.

It is an object of this invention to provide a spring suspension using a coil spring and in which the travel of the spindle carrying the wheel is along a fixed straight line.

It is another object of this invention to provide a type of spring suspension using a coil spring around a generally vertical king pin in which the position of the king pin may be readily adjusted to provide various angles between the wheel and the road.

It is another object of this invention to provide a steering knuckle slidable upon a vertical king pin and having bearing points against the king pin which are widely spaced along the surface of the king pin so as to materially reduce the pressure on the king pin due to the turning moment of the steering knuckle transverse to the axis of the king pin.

It is another object of this invention to provide a steering knuckle slidable along a generally vertical king pin in which the bearing surfaces between the steering knuckle and the king pin are sealed from exposure to dust and water.

It is another object of this invention to provide a steering mechanism comprising a steering knuckle slidable along a vertical king pin and having bearing surfaces between the steering knuckle and king pin which facilitate both the vertical movement of the steering knuckle along the king pin and the rotative movement of the steering knuckle about the king pin.

Other objects and advantages of this invention will be apparent upon consideration of the following description of the attached drawings of which there are seven sheets and in which Figure 1 represents a front view of an automobile front axle, frame and spring assembly;

Figure 2 represents a horizontal view of the assembly shown in Figure 1;

Figure 4 is a vertical section taken along the broken line 4—4 of Figure 2 and looking in the direction of the arrows;

Figure 7 is a section along the line 7—7 of Figure 2 and looking in the direction of the arrows;

Figure 8 is a section taken along the line 8—8 of Figure 7 and looking in the direction of the arrows;

Figure 9 is a sectional view similar to Figure 4 and illustrates a modification of the construction shown in Figure 4;

Figure 10 is a sectional view taken along the broken line 10—10 of Figure 9 and looking in the direction of the arrows;

Figure 11 is a section taken along the line 11—11 of Figure 9 and looking in the direction of the arrows;

Figure 12 shows a further modification of the structure illustrated at Figure 4;

Figure 13 illustrates a section taken along line 13—13 of Figure 12;

Figure 14 represents another modification of the structure illustrated in Figure 4;

Figure 15 is a section taken along the line 15—15 of Figure 14;

Figure 16 is a still further modification of the structure shown in Figure 4;

Figure 17 is a section taken along the line 17—17 in Figure 16;

Figure 18 is a section taken along the line 18—18 of Figure 2;

Figure 19 is a view similar to Figure 4 and showing another modification of my invention;

Figure 20 is a section, partially broken away, taken along the line 20—20 of Figure 19 and looking in the direction of the arrows; and Figure 21 is an elevation of the structure shown in Figure 20.

Figure 3:
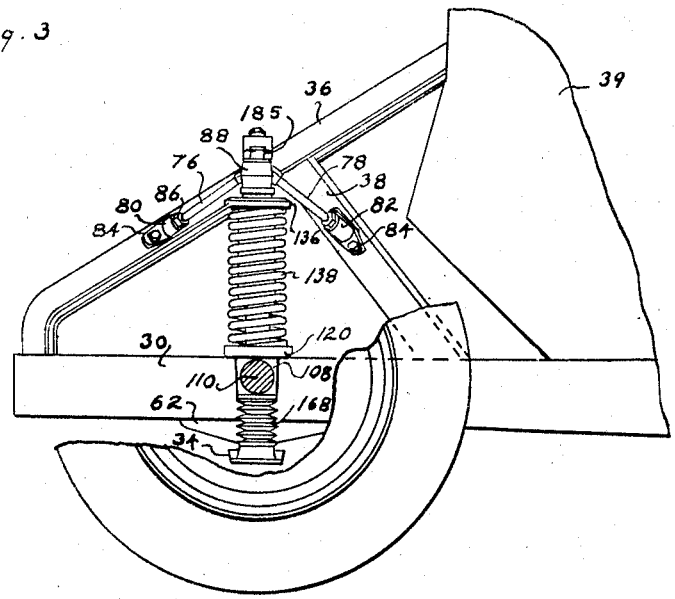
Figure 3 represents a partially broken away side elevation of the assembly shown in Figures 1 and 2.
Figure 5:
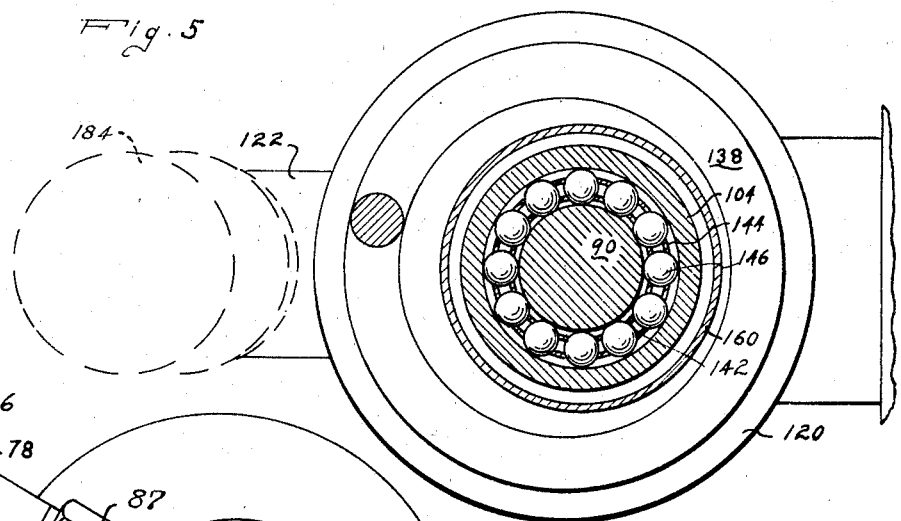
Figure 5 is a section taken along the line 5—5 of Figure 4 and looking in the direction of the arrows.
Figure 6:
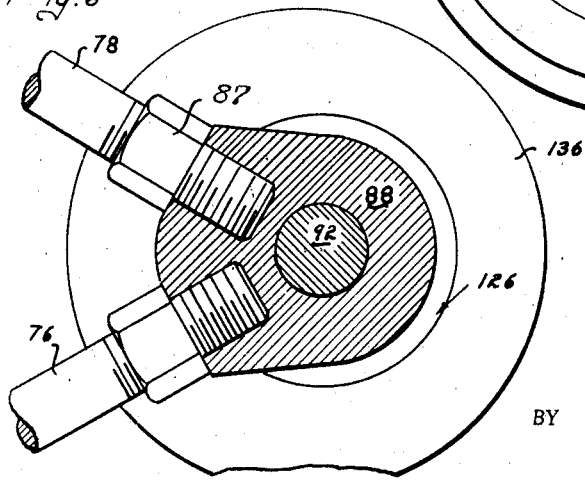
Figure 6 is a section taken along the broken line 6—6 of Figure 4 and looking in the direction of the arrows.

I have shown my invention to be applied to an automobile having a unitary type of frame and body, but it may obviously be applied to an automobile having the normal chassis frame and separate body construction.

Throughout this description of the various modifications of my invention I have given the same reference characters to like parts performing the same function whether they are in one or more of the modifications. As far as possible I have attempted to number similar but modified parts of the various modifications with the same numbers in different hundreds. Where parts of one modification have not been particularly described, it is to be assumed that these parts are the same as the corresponding parts of other modifications which have been particularly described.

In Figures 1, 2 and 3 I have illustrated the front end of an automobile having side sill members 30 connected at the front end by cross member 32 and provided with a cross member 34 which is a rigid axle bolted to the side sills 30. Rigidly attached to the front of the said members and forming a part of the body frame are the inclined braces 36 and the struts 38. The members 36 and 38 may be fastened to the side members and to each other by suitable means such as welding and are arranged to form integral parts of the automobile body 39.

Fastened on the ends of the cross member 34 is the wheel support assembly generally indicated at 40. The wheel support assembly is arranged to support the wheels 42 in a manner which will be more particularly described later. The cross member 34 has a flattened surface 44 (see Figure 18) to which is fastened a steering gear 46 having a pitman arm 48 which is operated by the steering gear in any normal manner. The flat surface 44 is in the plane of steering column 45 and serves to properly align the steering gear 46 which is bolted to the surface. The pitman arm 48 is connected to the drag link 50 which is in turn connected to the steering knuckle arm 52 on the right hand king pin assembly of the automobile. Tie rod 54 is provided between the steering knuckle arm 52 and the steering knuckle arm 56 on the left hand king pin assembly. Steering knuckle arms 52 and 56 are connected to the king pin assemblies for turning the front wheels of the automobile in a manner which will be more particularly described later. The various connections in the steering linkage are of the familiar ball and socket type.

The front axle or cross member 34 is in the form of an inverted channel member having stiffening flanges 60 along its bottom edges as is most clearly shown in Figures 7, 8 and 18. The axle 34 is fastened to the bottom of the side sill members 30 by means of the brackets 62 which are bolted to the axle 34 by means of bolts 64 and welded to the under surface of the side frame members 30. It will be noted that the side sill members are box shaped in cross section, being made up of a channel member 66 and a flanged plate 68 welded to the channel 66. The top surface 70 of the brackets 62 supports the bottom side of the channel 66 and may be fastened thereto as by welding of the two parts. I have shown the channel 66 to have a downturned flange 72 to which the plate 68 is welded. This flange 72 and the lower portion of the plate 68 may be cut away adjacent to the cross member or axle 34 to allow the axle to fit flush against the bottom of the channel 66.

The ends of the axle 34 are curved downwardly and shaped to provide a flat seat portion 74 at each end of the axle. This seat portion 74 supports the wheel supporting assemblies and since the construction is the same on each side of the car, only one side will be described in detail.

The top of the wheel supporting assembly is braced from the inclined frame member 36 and the strut 38 by means of brace rods 76 and 78. The rods 76 and 78 are received in threaded bosses 80 and 82 which are fastened to the inclined frame member 36 and the strut 38 respectively by some suitable means such as the bolts 84. The brace rods 76 and 78 are provided with lock nuts 86 by means of which the position of the brace rod in the bosses 80 and 82 may be fixed. The other ends of the brace rods 80 and 82 are received in holes tapped in the bracket 88 carried on the top of the king pin assembly and may be provided with lock nuts 87 for fixing the position of the brace rods relative to the brackets 88. It should thus be apparent that while the top of the king pin assembly is held rigid by means of the brace rods 76 and 78, the position of the king pin assembly relative to the car frame may be adjusted to various angles by turning the brace rods 76 and 78 to a greater or less extent into the threaded bosses 80 and 82. This allows the wheels to be adjusted as to caster and camber. The length of tie rod 54 may be changed to adjust toe-in. Attention is called to the fact that the right wheel (the left wheel as illustrated in Figure 1) is shown in a lowered position as in rebound after passing over a bump. While I have illustrated my invention as applied to the front wheels of a car, it could be applied to the rear wheels by providing proper driving connections through the spindle 110.

Considering now the construction of the king pin assembly, attention is called to Figure 4 in which is shown the end of the axle 34 with its flat seat portion 74 and the bracket 88 to which is attached the brace rod 76 in the manner just described. I have shown a king pin 90 which is a steel shaft having a top portion 92 of reduced diameter passed through a hole in the bracket 88 and a bottom portion 94 of reduced diameter passed through a hole in the flat seat 74 of the axle 34. The bottom portion 94 of the king pin axle may be threaded and fastened to the axle by means of a nut 96. I have provided a washer 98 between the axle 34 and the nut 96 and a washer 100 between a shoulder on the king pin 90 and the top surface of the axle 34. The top of the king pin 90 is also threaded to receive the nut 102 which fastens the top of the king pin to the bracket 88.

Positioned around the king pin 90 is a cylindrical sleeve 104 having a lower portion 106 which is tapered downwardly. The downwardly tapered portion 106 is drive fitted into a tapered hole in the steering knuckle 108. The steering knuckle 108 is a generally cylindrical shaped forging from which projects a spindle 110 and the steering knuckle arm 56 for turning the steering knuckle. The spindle 110 is provided with a flange 112 to which I have bolted the backing plate 114 of a brake assembly (not shown). The spindle is arranged to receive the bearings 116 on which the hub 118 of the wheel 42 turns.

The top of the steering knuckle is machined flat to receive the cup shaped spring seat 120 which fits over the sleeve 104. The side of the steering knuckle toward the center of the car is machined off flat to receive the shock absorber bracket 122 which is fastened to the steering knuckle by means of the bolt 124.

Near the top of the king pin I have provided a bearing assembly generally indicated at 126 which consists of a downwardly facing cup shaped ring 128 and an upwardly opening annular channel member 130 within which are positioned the ball races 132 for retaining the ball bearings 134. The bearing assembly 126 forms an abutment for the downwardly facing cup shaped spring seat 136 which cooperates with the lower spring seat 120 to retain the coiled spring 138. The weight of the car is thus supported from the wheel by means of the spring seat 120 through the spring 138 to the spring seat 136 which bears against the bracket 88 and king pin 90 through the bearing assembly 126.

In order to provide for the easy movement of the sleeve 104 along the king pin 90 there is provided the bearing assembly generally indicated at 140 between the surface of the king pin and the inside surface of the sleeve 104. This bearing assembly consists of a cylinder 142 having return flanges 144 at each end. The ends of the cylinder and the return flanges are perforated at spaced points around the cylinder to receive the ball bearings 146 which form the bearing between the king pin and the inside surface of the sleeve 104. It will be noted that the bending moment transverse to the axis of the king pin caused by the wheel reaction applied to the spindle at a point offset from the axis of the king pin is opposed by forces acting through the bearings 146 which are spaced a considerable distance apart by the cylinder 142. Thus, as viewed in Figure 4, the top bearings 146 will tend to move to the left, and the lower bearings 146 will tend to move to the right. By increasing the distance between the bearings I am able in effect to increase the lever arm of the force opposing this bending and thus decrease the pressure at the point of contact of the bearings.

In order to keep dust from accumulating around the bearings 146 I have provided leather washers 148 at each end of the bearing assembly, which washers are in sliding contact with the inside surface of the sleeve 104 and the surface of the king pin. The washers 148 are held against the bearing assembly 140, and the assembly itself is yieldingly maintained near the vertical center of the king pin by means of an upper spring 150 and a lower spring 152 which telescope the king pin and abut against the upper spring seat 136 and the washer 100 at the bottom of the king pin. I have also provided annular steel washers 154 between the springs 150 and 152 and the sealing washers 148. These last washers 154 are to resist any wear which might occur between the springs and the sealing washers 148.

In order to maintain the bearing assembly 140 within the sleeve 104 in case of failure of one or both of the springs 150 and 152, I have provided the snap rings 156 which fit in grooves cut in the inside surface of the sleeve 104 at each end of the sleeve. These rings will engage the sealing washers 148 should the bearing assembly tend to slide out of the sleeve 104.

To further exclude dust from the king pin and its bearing 140, I have provided the cylinder 160 having an inturned flange 162 at its upper end. This cylinder envelopes the upper end of the sleeve 104 and is held in place by means of the spring 164 which holds the cylinder against the upper spring seat 136. The lower end of the spring 164 abuts against a metal washer 165 which holds an annular leather dust washer 166 in contact with the top of the sleeve 104. The washer 166 is maintained in sliding contact with the inside surface of the cylinder 160 and prevents dust from rising along the outside of the sleeve 104 and passing into the top of the sleeve from where it could filter down to the bearing assembly 140.

The bottom of the sleeve 104 is sealed against dust by means of a bellows 168 which is fastened to the internally threaded ring 170 and screwed onto a tapped portion 172 at the lower end of the sleeve 104. This ring 170 also serves to help retain the steering knuckle on the tapered portion of the sleeve. The lower end of the bellows 168 is sealed between the washer 100 and the seat portion 74 of the axle 34.

The bracket 88 at the top of the king pin is provided with an arm 176 which terminates in a seat portion 178 which is drilled as at 180 to receive the threaded bolt 182 which forms the bayonet member of a strut type shock absorber 184. The shock absorber is fastened to the seat 178 by means of the nut 185 which screws down on the bolt 182 and the connection is cushioned by means of rubber biscuits 186 and cup-shaped metal washers 188 such as are commonly supplied with shock absorbers of this type. The lower end of the shock absorber 184 is provided with a bayonet member 182 in the same manner as the upper end of the shock absorber and is fastened through a hole in the bracket 122 in the same manner by which the top of the shock absorber is fastened to the bracket 176. The shock absorber itself is not claimed as part of this invention but it is to be noted that my method of mounting the shock absorber permits the use of a relatively long strut type shock absorber having a considerable path of travel.

It should be evident that with this construction the sleeve 104 and therefore the steering knuckle and wheel will travel in a fixed line up and down the rigid king pin as the wheel passes over uneven ground. As the steering knuckle is turned by the steering knuckle arm 56 from the steering gear 46, the shock absorber bracket 122 will swing in a short arc and the rubber biscuits 186 of the shock absorber connection will yield enough to allow the shock absorber to take up its new position.

In regard to dimensions of the king pin assembly, it is obvious that the parts will be designed with sufficient strength to carry the loads which will be applied to them. There is, however, a definite relationship between path of travel or displacement of the sleeve, the length of the sleeve and the length of the king pin. The displacement for a particular car may be figured from its weight and the strength of the spring and may here be considered a known factor. While the sleeve is moving two units of length with respect to the king pin, the bearing will move one unit in the same direction due to the action of the balls rolling between a fixed and moving surface. The bearing will therefore move one unit, relative to the sleeve, in the opposite direction from the sleeve. Therefore, if the bearing is to remain in the sleeve, the effective length of the sleeve must equal one half of the displacement plus the length of the bearing. The king pin must be as long as the displacement plus the length of the sleeve or one and one half times the displacement plus the length of the bearing. This may of course be increased to provide for connections on the king pin and connections on the sleeve beyond its effective bearing length such as the bellows and the dust washer. The length of the bearing is computed by considering the load carried and its moment arm about the king pin and the bearing pressures desired. With the displacement and bearing length decided, the length of sleeve and king pin may easily be computed.

Illustrated in Figures 9, 10 and 11 is a modified type of king pin construction embodying my invention. In this modification the axle 34 which supports the lower end of the king pin 90 is the same as in the first form of my invention just described, and the mounting of the king pin within the bellows 168 is the same as has just been described. The bracket 288, which supports the upper end of the king pin, is recessed as at 289 and is arranged to rest directly on the shoulder 290 of the king pin. In other respects the bracket 288 is the same as the bracket 88 in the first structure of my invention just described having the same shock absorber bracket 176 and the same brace rods 76.

The steering knuckle 108 is the same as in the first example of my invention having the same spindle 110 for supporting the wheel 42 and the backing plate 114, while the opposite side of the steering knuckle is fitted with the same bracket 122 for connection with the same shock absorber 184.

The sleeve 304 is different from the first sleeve 104 in that the tapered portion 306 of the sleeve extends beyond the rest of the sleeve forming the shoulder 307 upon which rests the spring seat 320. The spring seat 320 may be a cup shaped stamping having the flange 321 for supporting the coil spring 138 which is the same as in the first example of my invention.

The bearing 340 between the king pin 90 and the sleeve 304 consists of a retaining cylinder 342 having the flanges 344 (Figure 11) folded in radially toward the center of the cylinder. These flanges extend the full length of the cylinder, and the faces of the cylinder 342 between the flanges 344 are perforated to form a vertical series of apertures to retain the ball bearings 346. As in the first example of my invention the retaining cylinder 342 extends for a considerable distance along the length of the sleeve 304 to spread the bearing forces over a considerable area.

The bearing assembly 340 is retained midway of the king pin by the same coil springs 150 and 152 as are used in the first example of my invention. The bearings are also protected from dust by the same washers 148 and 154 which are positioned at each end of the assembly.

The inside of the sleeve 304 is provided with the same snap ring 156 for retaining the bearing assembly within the sleeve.

The upper ends of the sleeve and king pin are protected from dust by means of the dust shield 360 which in this modification has an outturned flange 362 which is held against the upper spring seat 336 by the main coil spring 138. In this modification the sealing gasket 366, which slides within the dust shield 360, is fixed to the top of the sleeve 304 by some suitable means such as cementing and also serves as a bumper for contacting the rubber bumper 371. This rubber bumper construction is more clearly illustrated in Figure 10 and shows the bumper 371 to be tooth shaped so that the gasket 366 will at first encounter little resistance in pressing against the bumper 371, but will rapidly meet greater resistance as the teeth of the rubber bumper are deformed to form a solid rubber abutment. It will be noted that the rubber bumper 371 is provided with a portion of an enlarged diameter 373 which engages an enlarged portion 361 of the dust shield 360 for retaining the rubber bumper in position.

The thrust bearing assembly 326 between the upper spring seat 336 and bracket 288 is provided with roller bearings 334 instead of ball bearings 134 used in the first example of my invention, and a single cylindrical shield 328 is used to seal the bearing assembly from dust. The upper spring seat 336 is a flat metal washer drilled to fit around the king pin.

In Figures 12 and 13 is illustrated a further modification of my invention in which the king pin bearing assembly 540 is provided with a cylindrical retainer 542 which is drilled with a series of spirally arranged holes 541 within which are located the ball bearings 546. It is to be noted that the holes 541 are generally spherical in shape to better retain the bearings 546 which are of slightly larger diameter than the thickness of the walls of the cylinder 542. This bearing assembly 540 may be used with either of the arrangements of the kin pin and sleeve heretofore explained.

Figures 14 and 15 illustrate a modified type of bearing construction for use in wheel suspensions embodying my invention. In these figures I have shown a series of bearing rings 740, each of which is made up of two annular retaining rings 742 which are oppositely pressed out at intervals as at 743 to form a retaining pocket for ball bearings 746. Each ring has its bearing retaining pockets so spaced that another ring may be placed on top of the first ring with its bearing retaining pockets resting between the pockets of the first ring. By this construction as many of the individual rings 740 as are desired may be joined together to form the bearing between the king pin 90 and the sleeve 104. The bearing rings 740 are retained between the sealing gaskets 148 held against the bearings by the springs 150. This modified type of bearing is also interchangeable with the bearings illustrated in the other modifications of my invention.

Illustrated in Figures 16 and 17 is a further modified type of construction involved in my invention. In this modification the lower spring seat 820 is supported on the sleeve 104 by means of a snap ring 821 which fits into a groove cut in the outside wall of the sleeve. The spring seat 820 is provided with an inclined flange 822 which fits over the snap ring 821. As the spring 138 forces the spring seat 820 downwardly, the flange 822 encounters the snap ring and increased pressure on the ring 821 only tends to wedge the ring tighter into its groove, thus assuring that the spring seat 820 cannot be forced down along the sleeve 104. The bearing assembly within the sleeve consists of a spacer cylinder 842 having the inturned flanges 843 at each end thereof. These flanges are narrow enough to fit between the king pin and the sleeve and form one abutment for the roller bearings 846 which are held against the spacer cylinder 842 by means of the dust gaskets 148, washers 154 and springs 150 which are the same as in the first example of my invention.

Particular reference is called to the bearings 846 in this modification of my invention. It is to be noted that the bearings are generally cylindrical in shape but are provided with a central groove 847 which is of the same radius as the king pin 90 and end portions which are turned on a radius 849 which is equal to the inside radius of the sleeve 104. I have found that this type of bearing increases the bearing area from the point contact of a ball bearing to the line contact of a roller bearing, thus reducing bearing pressures and increasing the life of the surface involved. At the same time this type of bearing offers little resistance to the turning motion of the sleeve about the king pin. Especially when the car is in motion, there is some vertical movement of the sleeve relative to the king pin, and any turning motion will move the bearings in a spiral path along the king pin rather than in a straight sliding motion. This type of bearing is also interchangeable with the other bearing structures disclosed in any of the combinations of sleeve and king pin.

In Figures 19, 20 and 21 I have illustrated an additional modification of my invention which is particularly economical to produce. In this modification the king pin 990 is centerless ground, which operation is much cheaper than the turning operation required on the first two examples of my invention. The king pin 990 is then drilled and tapped at each end as indicated at 992 and is retained on the axle 34 by means of a bolt 994 passed through a washer 996 and a hole in the axle 34 to the tapped portion 992 of the king pin. 993 represents a lock washer with an ear which is bent down over the nut 994 after the king pin has been bolted in place.

The top of the king pin is retained in the bracket 988 by a bolt 994 and a washer 996 in the same manner as at the bottom of the king pin. The bracket 988 may be provided with a tapped hole 989 to receive a grease fitting for lubricating the thrust bearing 926. The thrust bearing 926 rests against the bracket 988 and forms the abutment for the upper spring seat 936 within which is retained the rubber bumper 971 and the dust shield 960.

I have illustrated the lower spring seat 920 to be held in place by means of a snap ring 921 which fits into two grooves in the side of the sleeve 904 and contacts the inclined flange 922 of the lower spring seat in the same manner as does the flange 822 in Figure 16. In this modification I have provided the rubber or fabric gaskets 923 between the spring seats and the spring 138. These gaskets may be of any suitable soft or non-elastic material which will operate to dampen vibrations which might otherwise be passed through the spring from the wheels to the frame of the automobile. The conical rubber bumper 1010 is fixed to the axle 34 and cooperates with an extension 1012 on the shock absorber bracket to limit the rebound of the steering knuckle and shock absorber, but this structure is not claimed as a part of my invention.

The bearings 846 between the king pin and the sleeve are the same as the bearings illustrated in Figure 16 and 17 but are retained in a cage more particularly illustrated in Figures 20 and 21. Each cage consists of two annular metal plates 949 which are held in spaced relation by means of the radially positioned separators 950. The separators 950 may be provided with pins 952 to be passed through holes in the rings 949 and then riveted over. These separators 950 prevent one bearing from climbing over the end of another and becoming jammed between the walls of the sleeve and king pin. While I have illustrated four bearings separated by four separating plates, it is obvious that a greater or less number of bearings and separators could be used without departing from the spirit of my invention.

While I have described my invention in some detail, I intend this description to present examples only and not to be limiting upon my invention to which I make the following claims.

I claim:

1. In an automobile having a rigid frame structure, side rails extending along the sides of a motor compartment, raised portions on each side of said frame structure positioned generally over said side rails, a king pin fastened at its lower end to said frame structure, and adjustable struts between the top of said king pin and one of said raised portions of said frame for maintaining said king pin in a rigid position relative to said frame.

2. In an automobile having a generally vertical king pin rigidly mounted thereon, a sleeve positioned around said king pin, a steering knuckle carried by said sleeve, a spring seat carried by said sleeve, a second spring seat mounted for rotation around the upper end of said king pin and fixed against vertical movement, a coiled spring positioned between said spring seats, and vertically spaced bearings positioned within said sleeve and around said king pin, said bearings extending over a length of said king pin greater than the extent of said steering knuckle along said king pin.

3. In an automobile having a generally vertical king pin fixed thereon, a spring seat positioned near the upper end of said king pin, sealed bearing means between said spring seat and the end of said king pin, a coiled compression spring holding said spring seat against said bearing means, a sleeve mounted around said king pin, a steering knuckle carried on said sleeve, a second spring seat carried by said sleeve, said compression spring bearing against said second spring seat, a second bearing means positioned between said sleeve and said king pin, and means for sealing said second bearing means from the atmosphere around said sleeve.

4. In a vehicle having a generally vertical king pin fixed thereon, a spring seat positioned near one end of said king pin, sealed bearing means between said spring seat and the end of said king pin, a coiled spring holding said spring seat against said bearings, a sleeve mounted around said king pin, a steering knuckle carried by said sleeve, a second spring seat carried on said sleeve, said spring bearing against said second spring seat, a dust shield positioned on said king pin and around one end thereof, a gasket on one end of said sleeve and slidable inside of said dust shield, and a bellows between the other end of said sleeve and said king pin.

5. In a vehicle having a king pin, a sleeve positioned around said king pin and arranged to support a wheel, a coil spring positioned between said sleeve and the upper end of said king pin, bearing means between said sleeve and said king pin, a second coil spring around said king pin and supported from said sleeve and the upper end of said king pin, a cylindrical dust shield within said first mentioned coil spring and telescoping said sleeve, said dust shield being held in place by said second mentioned coil spring, and a sealing gasket carried by said sleeve in contact with said dust shield.

6. In a vehicle having a vertical king pin, a sleeve mounted around said king pin, a steering knuckle carried by said sleeve, means for mounting a compression spring around said sleeve for sustaining said steering knuckle from a fixed end of said king pin, and a cylindrical bearing retainer positioned between said king pin and said sleeve, said bearing retaining means being maintained in a position centrally of said king pin by means of springs telescoping said king pin.

7. In a vehicle having a king pin member, a sleeve member adapted to support a wheel and positioned around said king pin, bearing means between said sleeve and said king pin, and means for retaining said bearing means within said sleeve comprising snap rings supported by one of said first mentioned members and engageable with said bearing means at the limit of movement of said bearing means with respect to said sleeve.

8. In an automobile having a king pin, a sleeve adapted to support a wheel and positioned around said king pin, bearing means between said king pin and said sleeve, coil springs telescoping said king pin and yieldingly holding said bearing means midway of said king pin, and snap rings fitted in grooves in each end of said sleeve to prevent said bearing means from escaping from said sleeve.

9. In a vehicle having a fixed king pin, a sleeve arranged around said king pin, said sleeve being adapted to support a wheel for vertical travel along said king pin and for a turning motion around said king pin, bearing means between said sleeve and said king pin, said bearing means comprising roller bearings, a roller retaining cylinder, dust washers mounted at each end of said retaining cylinder, and spring means abutted against each end of said retaining cylinder, said roller bearings being mounted in said dust washers for rolling contact with said king pin and said sleeve.

10. In a vehicle having a king pin, a sleeve arranged around said king pin, bearing means between said sleeve and said king pin including a bearing retaining cylinder having a return flange at each end and holes through both said cylinder and said return flange, dust washers at each end of said bearing retaining cylinder, spring means abutted against each dust washer, and bearings in said holes in said bearing retaining cylinder in contact with said king pin and said sleeve.

11. In a vehicle having a fixed king pin, a sleeve adapted to carry a wheel and steering mechanism positioned around said king pin, and bearing means between said sleeve and said king pin, said bearing means comprising a ball retaining cylinder having inturned vertical fins with depressed flat faces therebetween and a series of holes drilled in each of said depressed flat faces for retaining bearings between said inturned vertical fins.

12. In a vehicle having a fixed king pin, a sleeve adapted to carry a wheel and steering mechanism positioned around said king pin, and bearing means between said sleeve and said king pin, said means comprising a cylinder having stiffening flanges pressed radially therefrom with ball retaining holes drilled between said flanges and ball bearings positioned in said holes.

13. In a vehicle having a fixed king pin, a sleeve adapted to carry a wheel and steering mechanism positioned around said king pin, and bearing means between said sleeve and said king pin, said bearing means comprising cylindrical shaped bearings having a groove in their center of the same radius as the king pin, and having end portions turned on a radius to fit the inside of said sleeve.

14. In a vehicle having a fixed king pin, a sleeve adapted to carry a wheel and steering mechanism positioned around said king pin, bearing means between said sleeve and said king pin, said bearing means comprising a spacer cylinder positoned around said king pin, and roller bearings positioned at each end of said spacer cylinder and having their central portion grooved to fit the surface of said king pin and their end portions tapered to fit the surface of said sleeve.

15. In a vehicle having a king pin, an upper abutment on said king pin, a sleeve carried by said king pin and adapted to support a wheel, a coil spring arranged to support said sleeve from said abutment, and a cylindrical bumper of deformable material positioned against said abutment and in line with said sleeve, the lower edge of said bumper having wavy projections thereon.

16. In a vehicle having a king pin, an upper abutment on said king pin, a sleeve carried by said king pin, a dust cylinder telescoping said sleeve and having an outturned flange held against said upper abutment, a dust washer on said sleeve slidable within said dust cylinder, and a cylindrical rubber bumper having a notched edge and held in place by said dust cylinder against said upper abutment and arranged to limit the travel of said sleeve with increasing force as said sleeve is pressed against said bumper.

17. In an automobile having a vertical king pin, a sleeve having a lower tapered portion and positioned around said king pin, a steering knuckle apertured to fit on said tapered portion of said sleeve and having a spindle and a steering arm attached thereto, bearing means between said king pin and said sleeve consisting of spaced sets of tapered concave roller bearings, a spring seat carried on said sleeve, a coil spring positioned between the top of said king pin and said spring seat, and a rubber bumper at the top of said king pin cooperable with the top of said sleeve.

18. In a vehicle having a vertical king pin, a sleeve positioned around said king pin, a tapered portion on the bottom of said sleeve, a steering knuckle apertured to receive the tapered portion of said sleeve, a groove around the outside of said sleeve, a split ring having a ridge around its inside surface adapted to engage the groove in said sleeve, an annular spring seat having an inner surface arranged to engage said split ring, an outer flange arranged to support a coil spring, and a coil spring positioned around said king pin between the top of said king pin and said spring seat.

19. In a vehicle having a fixed king pin, a sleeve spring mounted for sliding and rotating motion along said king pin, means for mounting a wheel on said sleeve, a bracket carried by said sleeve, an arm on a fixed portion of said automobile and terminating near said king pin, a shock absorber, and flexible means connecting said shock absorber between said arm and said bracket.

20. In an automobile having a rigid axle member fixed thereon, a king pin fixed at its lower end to said axle member, a bracket fixed to the upper end of said king pin, adjustable brace rods connecting said bracket with said automobile, an arm on said bracket adapted to receive a shock absorber connection, a spring mounted steering knuckle carried on said king pin and rotatable thereabout, a second bracket carried on said steering knuckle, and a shock absorber mounted between said second bracket and the arm on said first bracket.

21. In a vehicle having a king pin, a sleeve positioned around said king pin and arranged to support a wheel, a coil spring positioned between said sleeve and the upper end of said king pin, bearing means between said sleeve and said king pin, a second coil spring around said king pin and supported between said sleeve and the upper end of said king pin, a dust shield within said first mentioned coil spring and telescoping said sleeve, said dust shield being held in place by said second mentioned coil spring, and sealing means positioned between said dust shield and said sleeve.

22. In a vehicle having a generally vertical king pin, a sleeve mounted around said king pin, wheel supporting means carried by said sleeve, means for mounting a coil spring around said king pin for supporting said sleeve from a fixed end of said king pin, bearing means positioned between said king pin and said sleeve, and other spring means positioned around said king pin at each end of said bearing means for maintaining said bearing means in a position centrally of said king pin.

23. In an automobile having a generally vertical king pin, a sleeve having a tapered portion formed on its outer surface and being positioned around said king pin, a steering knuckle defining an aperture to fit on said tapered portion of said sleeve and having a spindle and steering arm attached thereto, bearing means positioned between said king pin and said sleeve, a spring seat carried on said sleeve, a coil spring positioned between the top of said king pin and said spring seat, a rubber bumper carried around said king pin near the top thereof cooperable with the top of said sleeve, and means fixed to the top of said king pin for backing up said bumper.

24. In a vehicle having a generally vertical king pin, a sleeve positioned around said king pin, wheel supporting means carried by said sleeve, a groove formed around the outside surface of said sleeve, a split ring having a ridge formed on its inside surface arranged to engage the groove in said sleeve, an annular spring seat having an inner surface arranged to engage said split ring, an annular flange formed on said spring seat arranged to support a coil spring, and a coil spring positioned around said king pin between the top of said king pin and said spring seat.

NILS ERIK WAHLBERG.